(12) United States Patent
Villeminey

(10) Patent No.: US 7,748,766 B2
(45) Date of Patent: Jul. 6, 2010

(54) VEHICLE SEAT ASSEMBLY AND METHOD FOR USE THEREOF

(75) Inventor: Jean-Paul Villeminey, Milford, MI (US)

(73) Assignee: GM Global Technology Operations, Inc., Detroit, MI (US)

(*) Notice: Subject to any disclaimer, the term of this patent is extended or adjusted under 35 U.S.C. 154(b) by 299 days.

(21) Appl. No.: 12/056,644

(22) Filed: Mar. 27, 2008

(65) Prior Publication Data

US 2009/0243325 A1 Oct. 1, 2009

(51) Int. Cl.
*B60N 2/00* (2006.01)
(52) U.S. Cl. ............... 296/64; 296/65.01; 296/65.03
(58) Field of Classification Search ............... 296/63, 296/64, 65.01, 65.03, 65.05, 65.06, 65.09, 296/65.11, 65.13
See application file for complete search history.

(56) References Cited

U.S. PATENT DOCUMENTS

| | | | | |
|---|---|---|---|---|
| 5,611,589 A | * | 3/1997 | Fujii et al. ............... 296/64 |
| 6,435,590 B2 | * | 8/2002 | Miyahara et al. ......... 296/65.11 |
| 6,457,765 B1 | * | 10/2002 | Bergquist et al. ............. 296/64 |
| 6,572,171 B1 | * | 6/2003 | Pautz et al. .................... 296/64 |
| 6,609,745 B2 | * | 8/2003 | Miyahara et al. ......... 296/65.11 |
| 6,648,393 B1 | * | 11/2003 | Milnar et al. ............. 296/65.11 |
| RE39,101 E | * | 5/2006 | Miyahara et al. ......... 296/65.11 |
| 7,380,859 B2 | * | 6/2008 | Gardiner ..................... 296/64 |
| 2002/0021016 A1 | * | 2/2002 | Bergquist et al. ........ 296/65.09 |

* cited by examiner

*Primary Examiner*—Lori L Lyjak
(74) *Attorney, Agent, or Firm*—Quinn Law Group, PLLC

(57) ABSTRACT

A seat row assembly is provided, having a first rail and a first seat movably connected to the first rail. A second seat is moveable between a first position and a second position, such that the second seat in its second position does not occupy the same space as in its first position. The first seat is configured to selectively move from a first position into a second position, in which it occupies space occupied by the second seat in its respective first configuration. A second rail, perpendicular to the first rail, is movably connected to the first rail such that the first seat is selectively movable along both the first rail and the second rail. The seats may be configured to fold to a collapsed configuration. A method of allowing access to a third row of seats in a vehicle having a second row of seats is also provided.

20 Claims, 8 Drawing Sheets

VEHICLE SEAT ASSEMBLY AND METHOD FOR USE THEREOF

TECHNICAL FIELD

This invention relates to a reconfigurable seat assembly for use in vehicles having two or more rows of seats.

BACKGROUND OF THE INVENTION

Many vehicles, such as minivans, sport utility vehicles, etc., include a region behind a row of seats, such as a storage compartment or another row of seats. Typically, the row of seats is between the region and an outside vehicle door. In order to provide access to the region, one of the seats adjacent the vehicle door may be selectively foldable or collapsible. Alternatively, there may be a gap in the middle of the row of seats through which a vehicle user may access the region.

SUMMARY OF THE INVENTION

A seat row assembly for use with a vehicle interior is provided. The seat row assembly includes a first rail, which may be configured such that it can be positioned transversely with respect to the vehicle interior when the seat row assembly is placed into a vehicle. A first seat is movably connected to the first rail and a second seat is mounted with respect to the first rail.

The second seat is moveable between a first position and a second position, such that the second seat in its second position does not occupy the same space as the second seat in its first position. The first seat is also configured to selectively move between respective first and second positions, such that the first seat in its respective second position occupies space occupied by the second seat in its first position but does not occupy the space occupied by the second seat in its second position. The first seat is configured to move to its second position without substantially altering the occupant seating position of the first seat. A second rail, perpendicular to the first rail, is movably connected to the first rail such that the first seat is selectively movable along both the first rail and the second rail, and therefore movable in two directions. The seats are capable of kneeling and folding to a small, flat collapsed configuration.

A folding passenger seat for use in a seat row is also provided. The folding passenger seat includes a seat back having a forward side and a rearward side, and a seat cushion having a front portion and a rear portion. The seat cushion and seat back are joined by a first hinge linking the seat back and seat cushion; a second hinge linking the first hinge and the rear portion of the seat cushion; and a slidable locking bracket configured to restrict pivoting of the second hinge.

The slidable locking bracket is movable between a locked position and an unlocked position, and the folding passenger seat has an upright seat configuration which may correspond to the locked position of the slidable locking bracket and a collapsed seat configuration which may correspond to the unlocked position. The collapsed seat configuration is characterized by a decrease in vertical height of the rear portion of the seat cushion and may be further characterized by rearward movement of the seat cushion relative to the upright seat configuration.

A method of allowing access to a third row of seats is also provided. The method is useful for a vehicle having a second row of seats with a middle passenger seat occupying a middle position and two side passenger seats occupying two outer positions. The method includes moving the middle passenger seat from a normal middle seat position to a cleared middle seat position, such that in the cleared middle seat position the middle seat does not occupy the same space as in the normal middle seat position. One of the two side passenger seats may then be laterally slid from one of the outer positions to the middle position, such that the laterally slid side passenger seat occupies the space previously occupied by the middle seat in the normal middle seat position. A further variation may include automatic actuation of the movement of the middle passenger seat and of the lateral sliding of the side seat in response to a signal from a control device.

The above features and advantages and other features and advantages of the present invention are readily apparent from the following detailed description of the best modes and other embodiments for carrying out the invention when taken in connection with the accompanying drawings.

DESCRIPTION OF PREFERRED EMBODIMENTS

Figure 1:
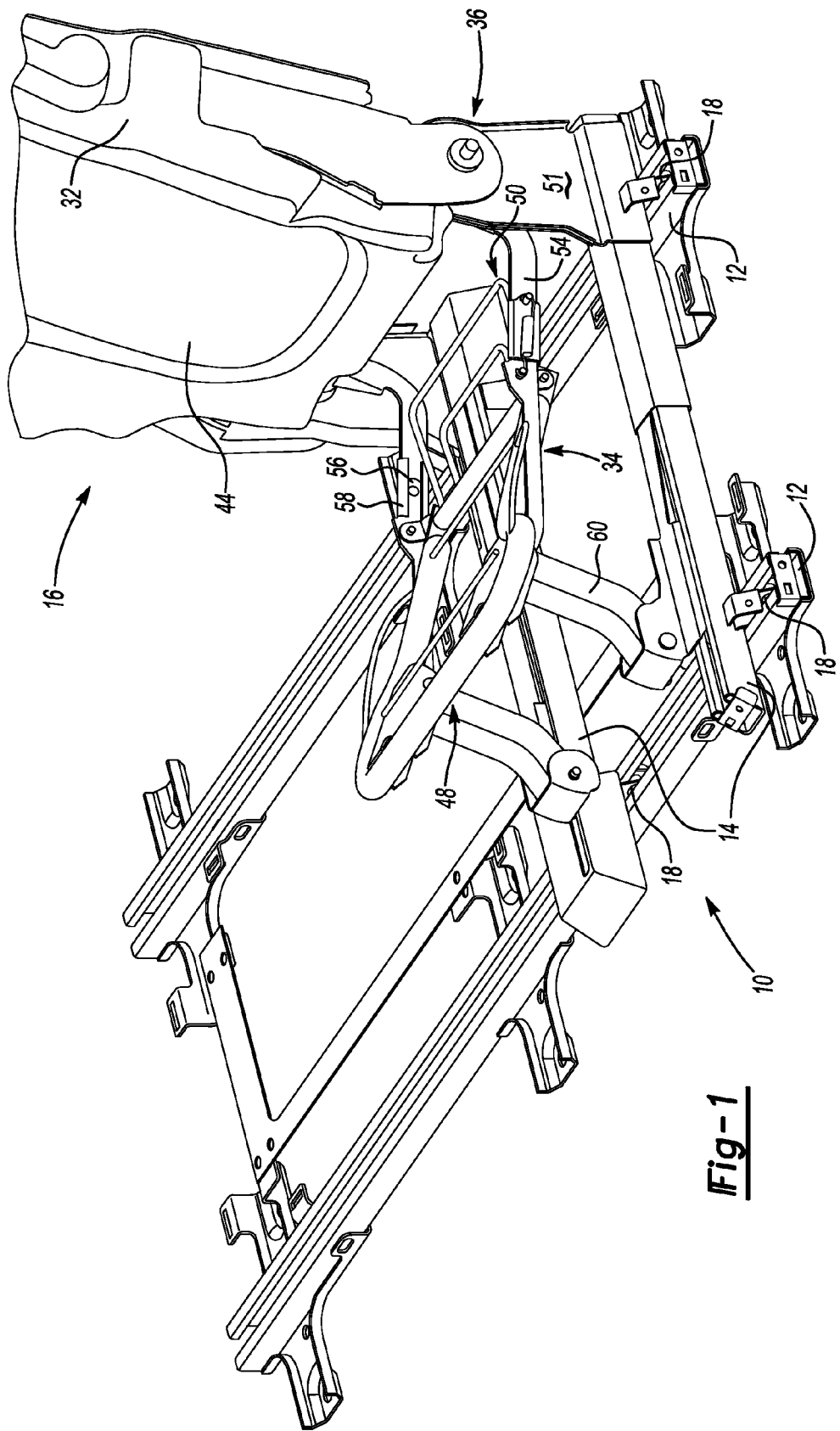
FIG. 1 is a schematic partial perspective view of an embodiment of a flexible seat row shown fully in FIG. 2.

Referring to the drawings, wherein like reference numbers correspond to like or similar components throughout the several figures, there is shown in FIG. 1 portions of an embodiment of a flexible seat row 10. This embodiment utilizes a unique structure which allows the seats to move in more than one direction (longitudinally and transversely).

Figure 2:
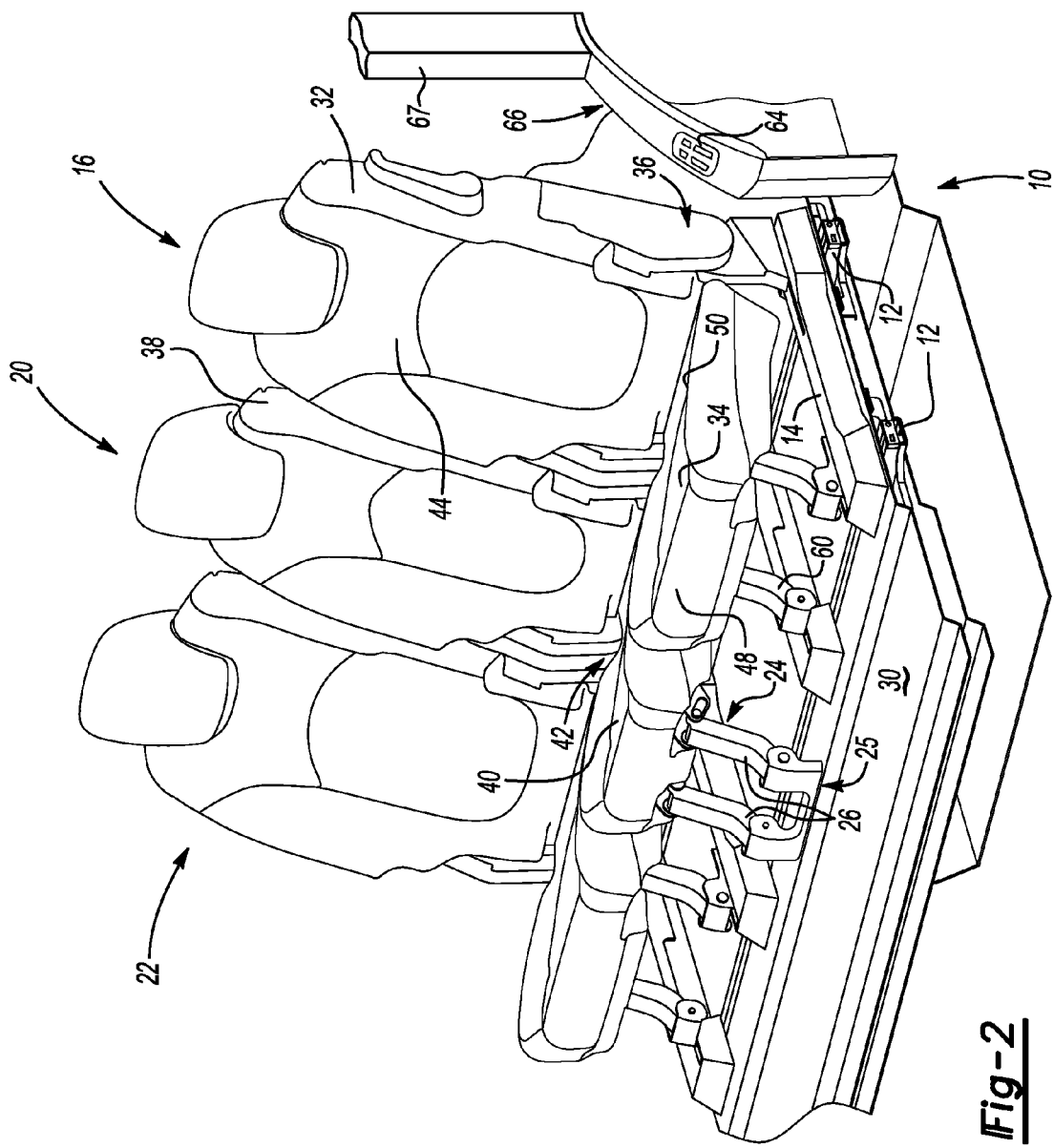
FIG. 2 is a schematic elevated perspective view of the embodiment of a flexible seat row partially shown in FIG. 1, showing a full seat row having two side seats on opposite sides of a middle seat.

A first direction of movement is provided by a pair of transverse tracks or rails 12, which are configured to attach to a vehicle floor pan (shown at 30 in FIG. 2). Movably or slidably attached to the transverse rails 12 are a pair of longitudinal tracks or rails 14, which are substantially perpendicular to the transverse rails 12. Thus, the longitudinal rails 14 are selectively movable in the transverse direction along the transverse rails 12. The longitudinal rails 14 provide for a second direction of movement.

A first seat 16 is slidably or movably attached to the longitudinal rails 14, and is selectively movable along the longitudinal rails 14 in the longitudinal direction. By attaching the first seat 16 to the transverse rails 12 through the longitudinal rails 14, the first seat 16 is capable of moving either transversely (laterally) or longitudinally, or along both axes, to infinite positions within reach of the flexible seat row 10.

As used in reference to the drawings, and throughout the specification and appended claims, terms such as "front," "middle," and "rear" are used to describe corresponding portions of a vehicle, as will be understood by those having ordinary skill in the art. "Longitudinal" refers to the lengthwise direction of the vehicle, relatively parallel to the centerline running from the front to the rear of the vehicle. "Transverse" refers to the crosswise direction of the vehicle, relatively perpendicular to the longitudinal direction. Note that in order to simplify the drawings and descriptions thereof, some of the attached figures show only two seats. This application, however, fully comprehends a seat row having three seats.

In the embodiment shown in FIGS. 1 and 2, first seat 16 is a side seat located on the left (driver) side of the vehicle. However, the first seat 16 could be similarly located on the right (passenger) side of the vehicle, or in the middle position. In embodiments with only two seats—such as seat rows only partial filling the seating space—the first seat 16 may be selectively moveable from right to left.

Inside of the rails 12 and 14, and facilitating the movable connections, are casters or rollers 18. As will be recognized by those having ordinary skill in the art, the rollers 18 may be configured to minimize noise and to allow controlled sliding so that the effort to slide is extremely low. Myriad roller designs and materials may be used to effect transverse and longitudinal movement of the first seat 16; for some applications, the rollers 18 may utilize a sliding mechanism instead of a rolling mechanism. As will be recognized by those having ordinary skill in the art, the rails 12 and 14 (or an individual rail) may be formed differently than shown, as long as they are capable of guiding the seats or attached rails in selective movement. The rails may be shaped as tracks having the rollers 18 inside of the track, or may be shaped such that the rollers 18 ride on the outside of the rail or track. Furthermore, rails or tracks could be formed as grooves in the floor pan 30.

Many vehicles include three rows of seats, with side doors adjacent the second row of seats. To maximize seating capacity, a vehicle designer may utilize the full second row by placing three seats in the second row, with two side seats in the outer positions and a middle seat in the middle position. FIG. 2 shows a full view of the embodiment of the flexible seat row 10 partially shown in FIG. 1. In addition to the first seat 16, FIG. 2 shows a second seat 20 in the middle position and a third seat 22 in the opposite side seat position. The third seat 22 is substantially identical to the first seat 16 and functions—as will be described below—in substantially the same way. As can be seen in FIG. 2, in a row of seats having two side seats (first and third seats 16 and 22) and a middle seat (second seat 20), there is little or no room for transverse movement of any individual seat. Furthermore, there is little or no room for ingress or egress to the area behind the seat row (such as a third row of seats or cargo area).

Figure 3:
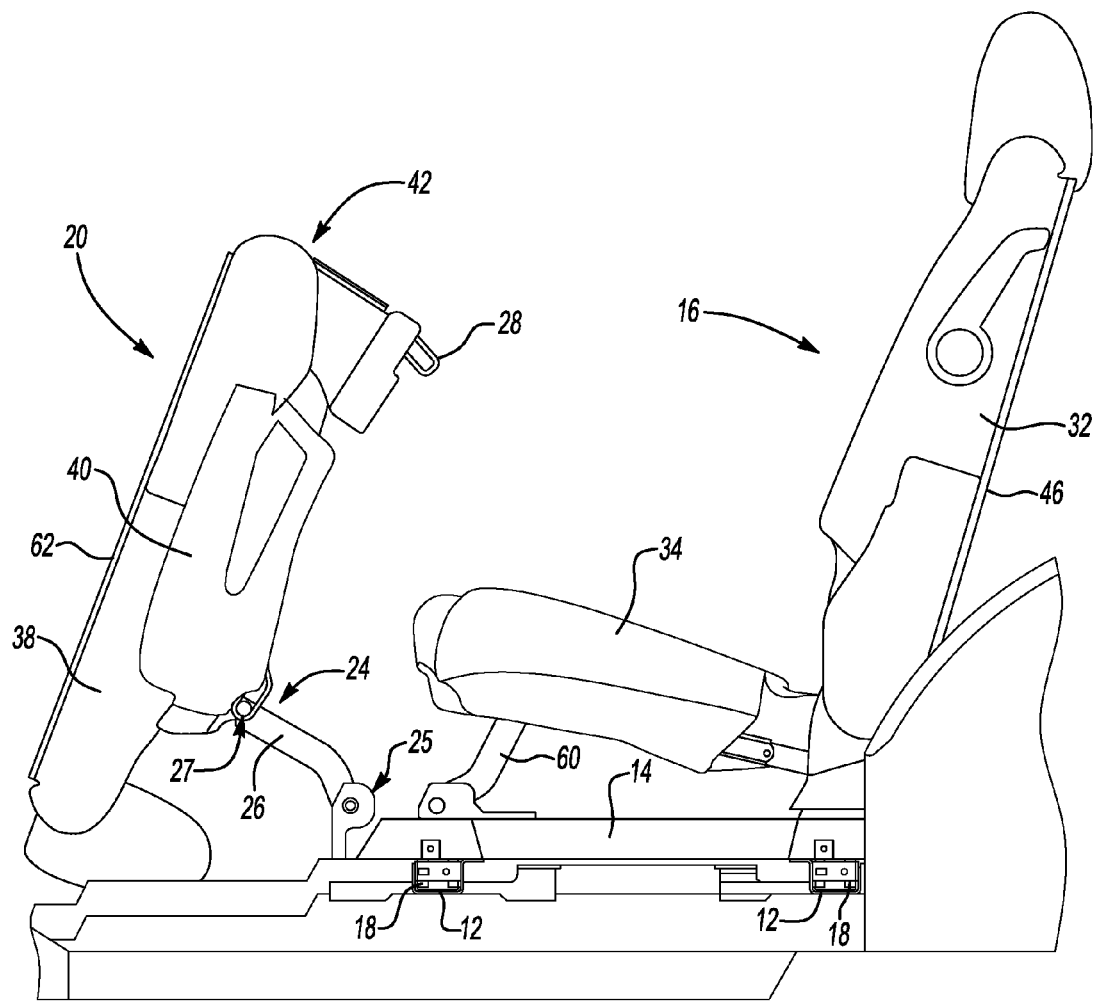
FIG. 3 is a schematic side view of the flexible seat row of FIG. 2, the middle seat is shown in a second position.

Referring to FIGS. 2 and 3, the second seat 20 is operatively mounted to an articulating bracket mechanism 24, which is mounted with respect to the transverse rails 12. One or more rearward clips 28 releasably connect the rearward side of the articulating bracket mechanism 24 to either the vehicle floor pan 30, the rearward rail of the transverse rails 12, or some other sturdy object in the area. The articulating bracket mechanism 24 may be integrated into the structure of second seat 20, or may separately be attached to the second seat 20. The articulating bracket mechanism 24 has a base hinge 25 that is mounted with respect to the floor pan 30 and positioned in front of (with respect to the vehicle,) and above, the forward rail of the transverse rails 12. A pair of arms 26 interconnects the second seat 20 and the hinge 25 such that the second seat 20 is selectively rotatable about a transverse axis through the hinge 25.

Figure 4:
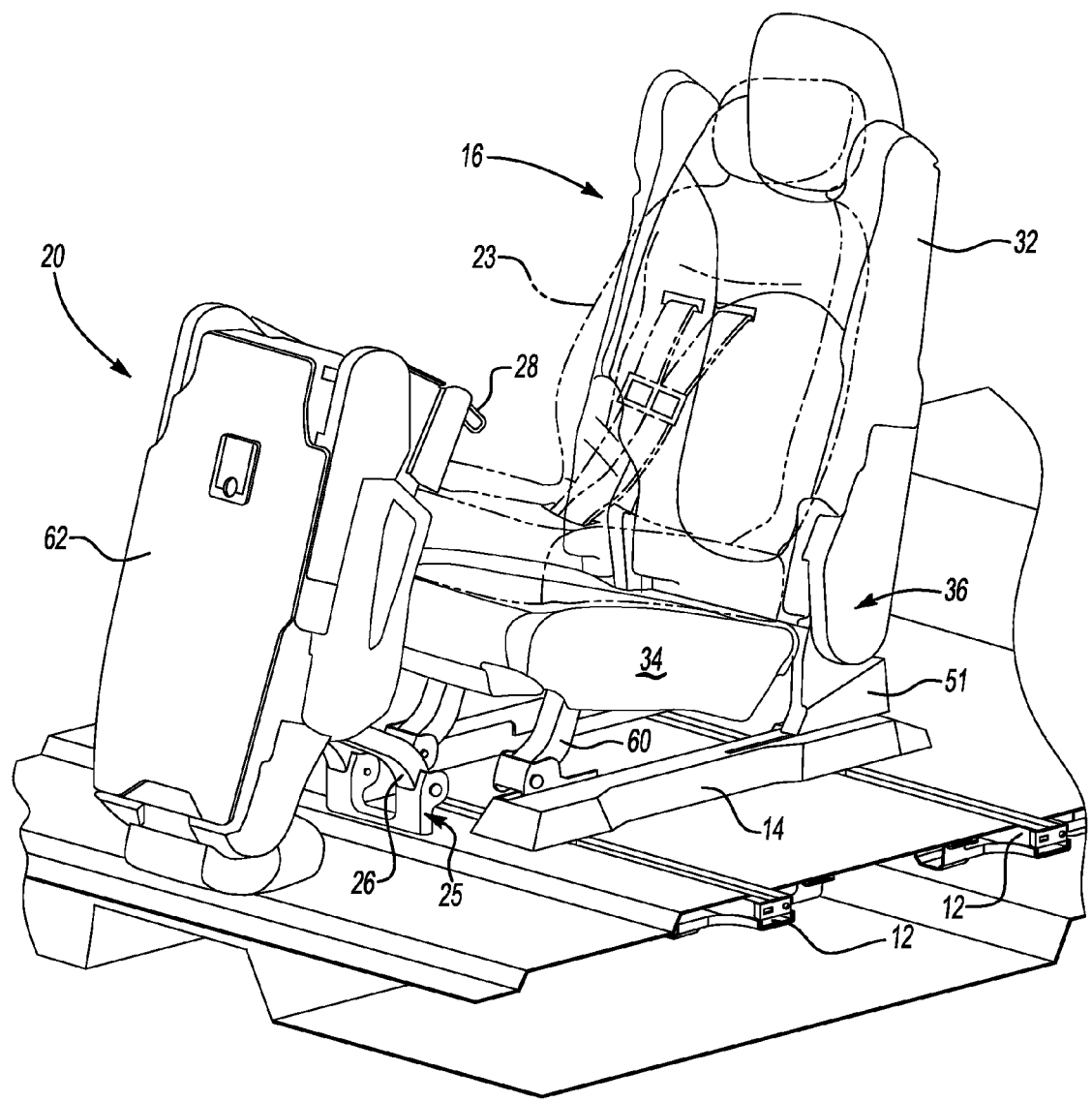
FIG. 4 is a schematic elevated perspective view of the flexible seat row of FIG. 3, showing the side seat—having an attached child seat in dashed lines—moved into its second position, which occupies the middle position of the seat row, which is vacated by the middle seat in its second position.

FIGS. 2, 3 and 4 demonstrate the transverse aspect of operation of the flexible seat row 10. In FIG. 2, the first and second seats 16, 20 are shown in respective first positions. The second seat 20 is shown in its first position is upright, occupiable, and between the first and third seats 16, 22. The first seat 16 is shown in its first position in upright, occupiable, and laterally located with respect to the second seat 20. The first and second seats 16, 20 are selectively movable to respective second positions.

More particularly, the second seat 20 and bracket mechanism 24 are movable about the hinge 25 to the second position of second seat 20, as shown in FIGS. 3 and 4. In its second position, the second seat 20 is pivoted forward and upward from its first position such that the second seat 20 in its second position is not between the first and third seats 16, 22, such that it has cleared the middle position of the flexible seat row 10. By rotating, moving, or otherwise articulating the second seat 20 away from the middle position, space is cleared such that one of the first and third seats 16 and 22 may selectively occupy the middle position.

In one embodiment, the hinge 25 has an internal spring mechanism (not shown) which selectively biases the second seat 20 toward its second position. The second seat 20 includes a locking pivot 27 at the ends of the arms 26 that releasably locks the second seat 20 in its second position. The second seat 20 may further rotate about a transverse axis of the locking pivot 27.

As described in more detail below, in this embodiment the second seat 20 also folds flat as it moves from the first to the second position. Once in its second position, the second seat 20 has completely vacated the space it occupies in its first position. The first seat 16 is then free to move from its first position, as shown in FIGS. 2 and 3, to its second position, as shown in FIG. 4. More specifically, the first seat 16 is selectively slidable in the transverse direction along the transverse rails 12 from its first position to its second position. When in its second position, side seat 16 occupies the middle position vacated by the second seat 20, and does so with little or no reconfiguration of the occupant seating position of side seat 16.

The third seat 22 is similarly configured to move transversely from its lateral position (as shown in FIG. 2) to the space occupied by the second seat 20 when the second seat 20 is in its first position. To facilitate movement of the third seat 22, the second seat 20 moves to the cleared position in a manner substantially identical to the process described above. The third seat 22 is then free to move into the vacated middle position in a manner similar to the movement of the first seat 16.

A flexible seat row 10 with a side seat 16 or 22 which is capable of selectively moving to the middle of the vehicle without reconfiguring the seating position of the side seat 16 or 22 garners many benefits for the vehicle designer and ultimate vehicle user. In vehicles with three rows of seats, moving the side seat 16 into its second position opens up a large clearance adjacent a side door for ingress and egress to and from the third row of seats. The embodiment shown achieves a clearance distance across the floor pan 30, between the seats and the vehicle's C-pillar 67, of 400 millimeters or more.

Many vehicle owners and users may wish to place a child restraint seat in one or both of the first and third seats 16 and 22. FIG. 4 shows, in outline, a child seat 23 on the first seat 16. Normally, access to the third row may require that the child seat 23 be removed from the first seat 16. However, the flexible seat row 10 allows access to the third row without the need to remove a small child or child restraint seat from the first seat 16 or third seat 22; because either of those seats may be moved to the middle position without substantially altering the occupant's seating position.

Figure 7:
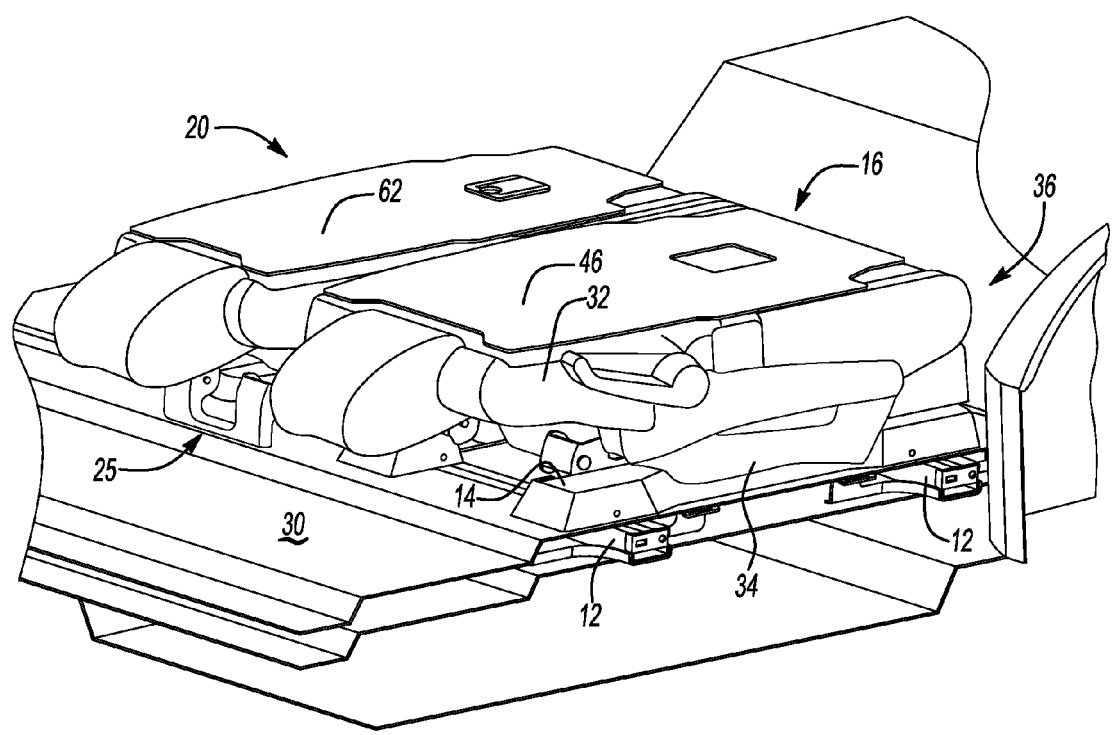
FIG. 7 is a schematic elevated perspective view of the flexible seat row, showing both seats in the collapsed configuration, maximizing cargo space.

To facilitate movement of the second seat 20 to its second position, and to add cargo flexibility to the vehicle interior, the second seat 20 and one or both of the first and third seats 16 and 22 may include structure allowing the seats to kneel and fold to a very compact, parallel collapsed configuration. FIG. 7 shows second seat 20 and first seat 16 in the collapsed configuration. A collapsed passenger seat configuration may seek to have low total volumetric envelope and also have a top surface parallel to the floor pan—creating a large, open, and flat cargo area. Referring again to FIG. 2, first seat 16 has a seat back 32 and a seat cushion 34, hingedly connected at a seat bite 36 (which will be described in more detail below). Third seat 22 is substantially identical to first seat 16. Second seat 20 similarly comprises a seat back 38 and a seat cushion 40, hingedly connected at a seat bite 42. As used in this description, "seat bite" refers generally to the area and mechanisms connecting the seat back and cushion portions.

In operation, as the seats move from the upright to the collapsed configuration, there is little difference between the structure and function of second seat 20 and first and third seats 16 and 22. Description of the structure for, and operation of, the collapsed configuration therefore focuses on the first seat 16 and seat bite 36, but generally applies to the other seats and seat bites, unless otherwise noted.

Seat back 32 has a forward side 44 and a rearward side 46 (viewable in FIG. 7), and seat cushion 34 has a front portion 48 and a rear portion 50. Seat designers may increase the amount of padding incorporated into the seat back 32 and seat cushion 34. However, increased padding may restrict the ability of the seat to collapse into a compact shape, and may result in a cargo area with less usable volume and an angled—as opposed to flat—lower surface for cargo stowed above and on top of rearward side 46. The flexible seat row 10 has structure causing the seat cushion 34 to kneel as side seat 16 moves into the collapsed configuration; resulting in a lowered, flat rearward side 46.

Figure 5:
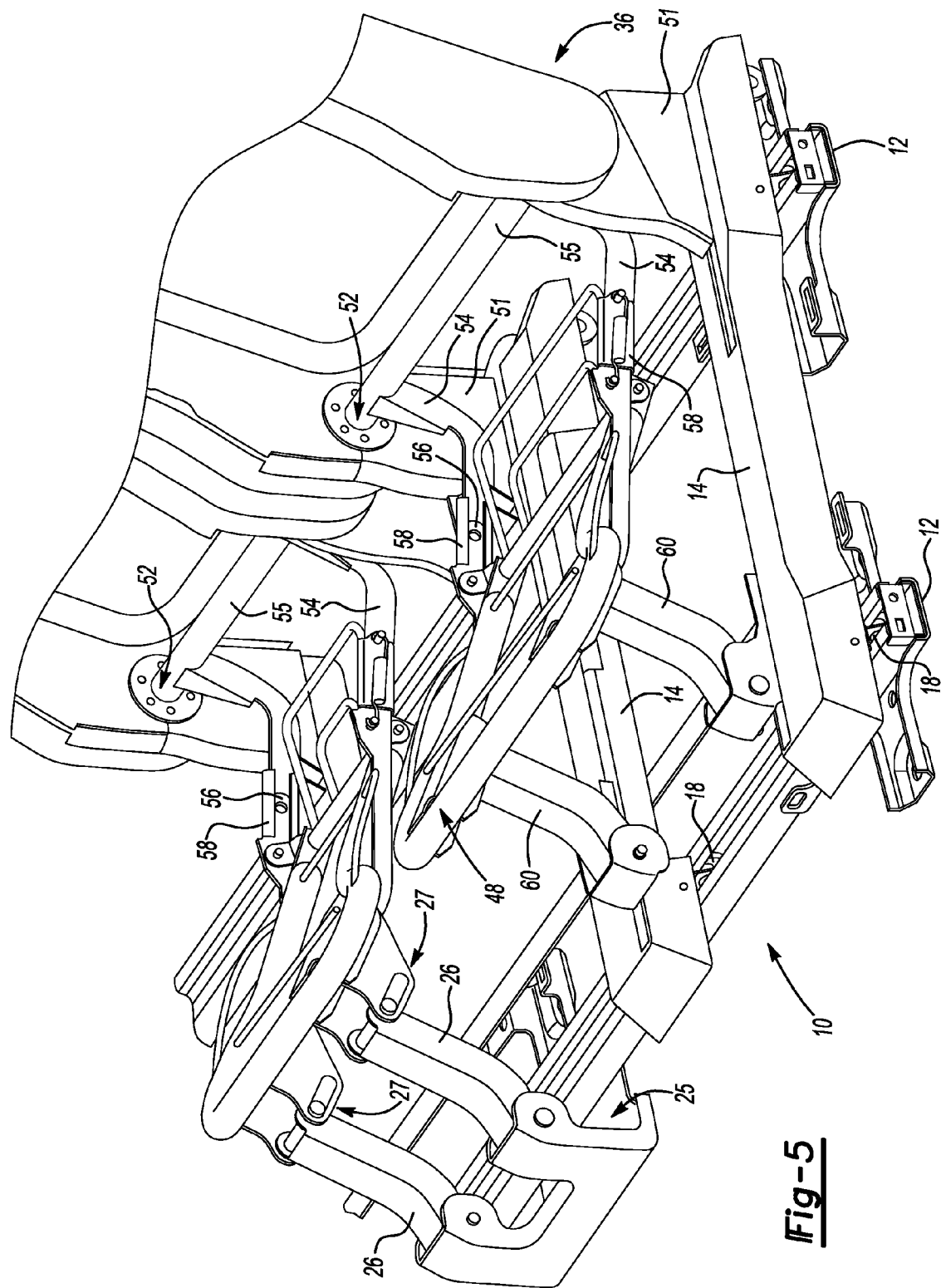
FIG. 5 is a schematic perspective view of the flexible seat row of FIG. 3, shown without seat padding in order to better illustrate the internal mechanisms of the seat bites, and showing both seats in an upright seating configuration.
Figure 6:
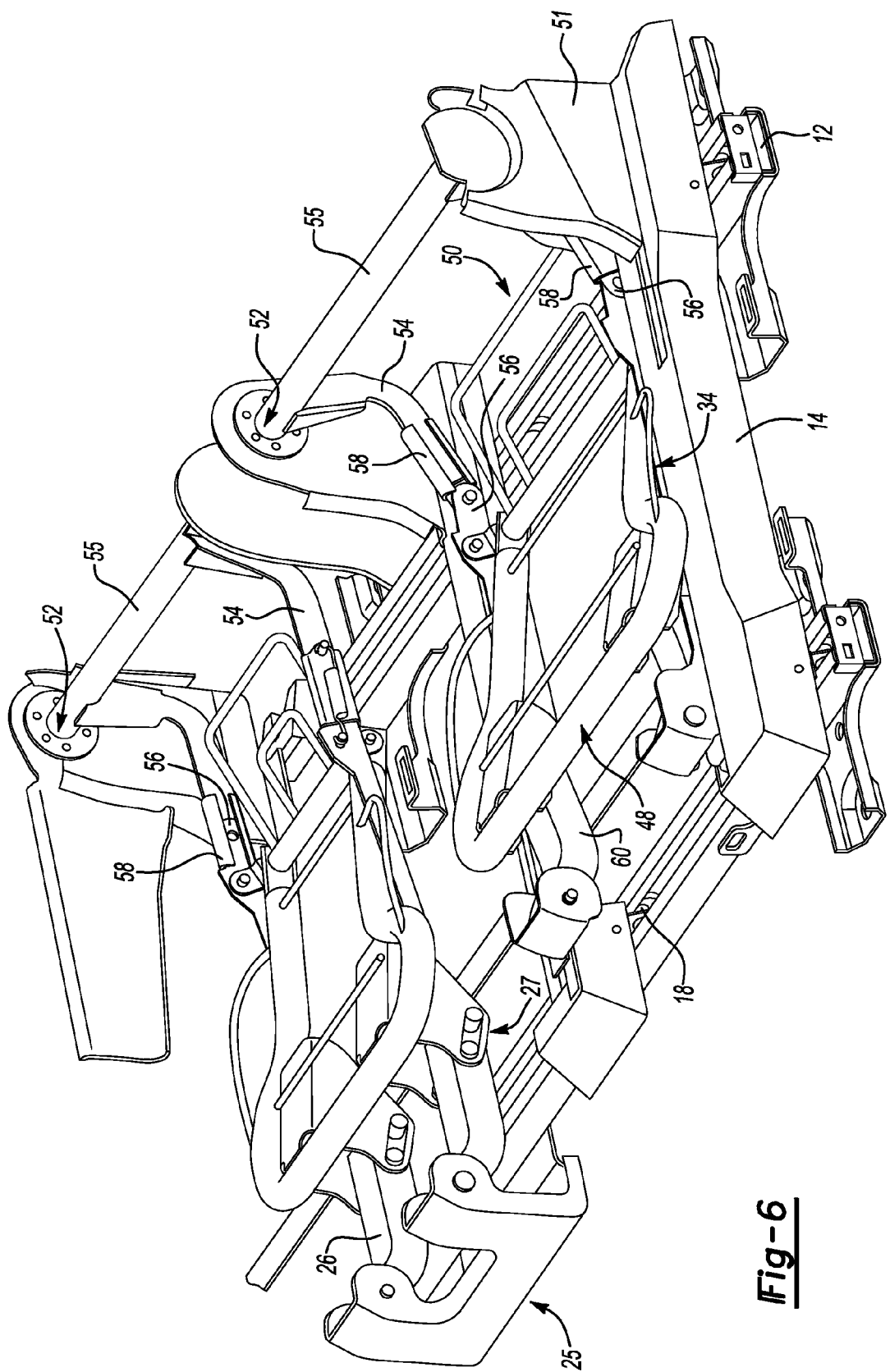
FIG. 6 is the same view as FIG. 5, shown with the side and middle seats in a collapsed position.

FIGS. 5 and 6 are close-up, partial views of the flexible seat row 10 shown in FIG. 2. FIG. 5 shows the first seat 16 and second seat 20 in the normal, upright seating configuration, and FIG. 6 shows the seat cushions 34 and 40 of first seat 16 and second seat 20 in the kneeling, collapsed configuration. To better view the internal mechanism of seat bites 36 and 42, seat cushions 34 and 40 and seat backs 32 and 38 are shown without padding in both FIGS. 5 and 6. Additionally, much of seat backs 32 and 38 are not shown in FIG. 6 in order to better illustrate the seat bites 36 and 42 in the collapsed configuration. Focusing, for illustrative purposes, on only the side seat 16, the seat back 32 and rear portion 50 of the seat cushion 34 are supported by rearward stanchions 51. These rearward stanchions 51 are operatively connected to the rollers 18 for movement along the longitudinal rails 14. The front portion 48 is supported by forward arms 60, which are pivotally connected to rollers 18 for movement along the longitudinal rails 14.

A first hinge 52 pivotally connects the seat back 32 to the seat cushion 34 via a swing arm 54 and pivot bar 55. First hinge 52 also provides the pivot point for the seat back 32 to rotate forward and down. Note that the right and left sides of the mechanism are substantially identical, but only the right side (which is viewable in FIGS. 5 and 6) is described. On a curved end of the swing arm 54 is a second hinge 56 which pivotally connects the swing arm 54 to the rear portion 50. Covering the second hinge 56, and configured to selectively restrict its movement, is a slidable locking bracket 58. As the slidable locking bracket 58 selectively moves from a locked position, shown in FIG. 5, to an unlocked position, shown in FIG. 6, the second hinge 56 becomes free to pivot.

Rotation of the first hinge 52 and (unlocked) second hinge 56 allows the seat cushion 34 to drop vertically and move rearward into a kneeling position, as shown in FIG. 6. Once the seat cushion 34 has dropped to clear space, side seat 16 may move to the collapsed configuration, as the seat back 32 is now free to pivot about the first hinge 52 until the rearward side 46 is parallel with the floor pan 30 (not shown in FIGS. 5 and 6, but generally level with the top of transverse rails 12). After dropping the seat cushion 34 into the kneeling position, full rotation of the seat back 32 is less restricted by the seat cushion 34 (and padding thereon). Furthermore, rearward side 46 is capable of being horizontal in the collapsed configuration and is thus able to form a flat cargo surface parallel to the vehicle floor pan 30.

Note that, as would be recognized by those having ordinary skill in the art, FIGS. 5 and 6 also demonstrate the minor differences in the mechanisms in the seat bite 42 of second seat 20 and the seat bite 36 of side seat 16. The second hinge 56 of second seat 20 operates in a manner substantially similar to that of side seat 16, but not identically. After the seat cushion has knelt and moved rearward, the slidable locking bracket 58 re-locks the second hinge 56 to lock the second seat 20 into the collapsed configuration. Re-locking the second hinge 56 of second seat 20 while in the collapsed configuration assists with movement (when desired) of second seat 20 to its second position (as shown in FIGS. 3 and 4) by providing stability. This restraint is not used in the side seats, as neither of those seats has to hold position after articulating into a cleared position. Furthermore, because the arms 26 sit further forward (in relation to the forward transverse rail 12) than the forward arms 60, the locking pivot 27 allows the forward arms 26 to slide in relation to the seat cushion 40. This allows the middle seat cushion 40 to fully kneel and slide rearward.

Those skilled in the art will recognize other ways to control the flexible seat row 10 to effect: movement of the second seat 20 from the normal to the cleared position; longitudinal and transverse movement of first and third seats 16 and 22; and movement of any of the seats 16, 20, and 22 from the normal seating configuration to the collapsed configuration. One possible embodiment uses a control panel 64 mounted on the forward side of the interior of wheel well 66 or on the vehicle's C-pillar 67. The control panel 64 would then signal electro-mechanical actuators to cause second seat 20 to move to the cleared middle seat position and one of the first or third seats 16 or 22 to move laterally to occupy the space formerly occupied by the second seat 20. Alternatively, the seats 16, 20, 22 may be manually operated via linkages and hand-actuated levers.

Further flexibility in the flexible seat row 10 is obtained through longitudinal (fore and aft, with respect to the vehicle) movement of the first and third side seats 16 and 22. Focusing primarily on first seat 16—although third seat 22 is substantially identical—FIGS. 2 through 7 show the first seat 16 in a forward longitudinal position, such that the rearward side 46 is longitudinally positioned to be substantially planar with the rearward side 62 of the second seat 20. While both side seats are in the forward longitudinal position, the flexible seat row 10 presents occupants of either the second seat 20 or the first and third seats 16 and 22 with similar leg room.

Figure 8:
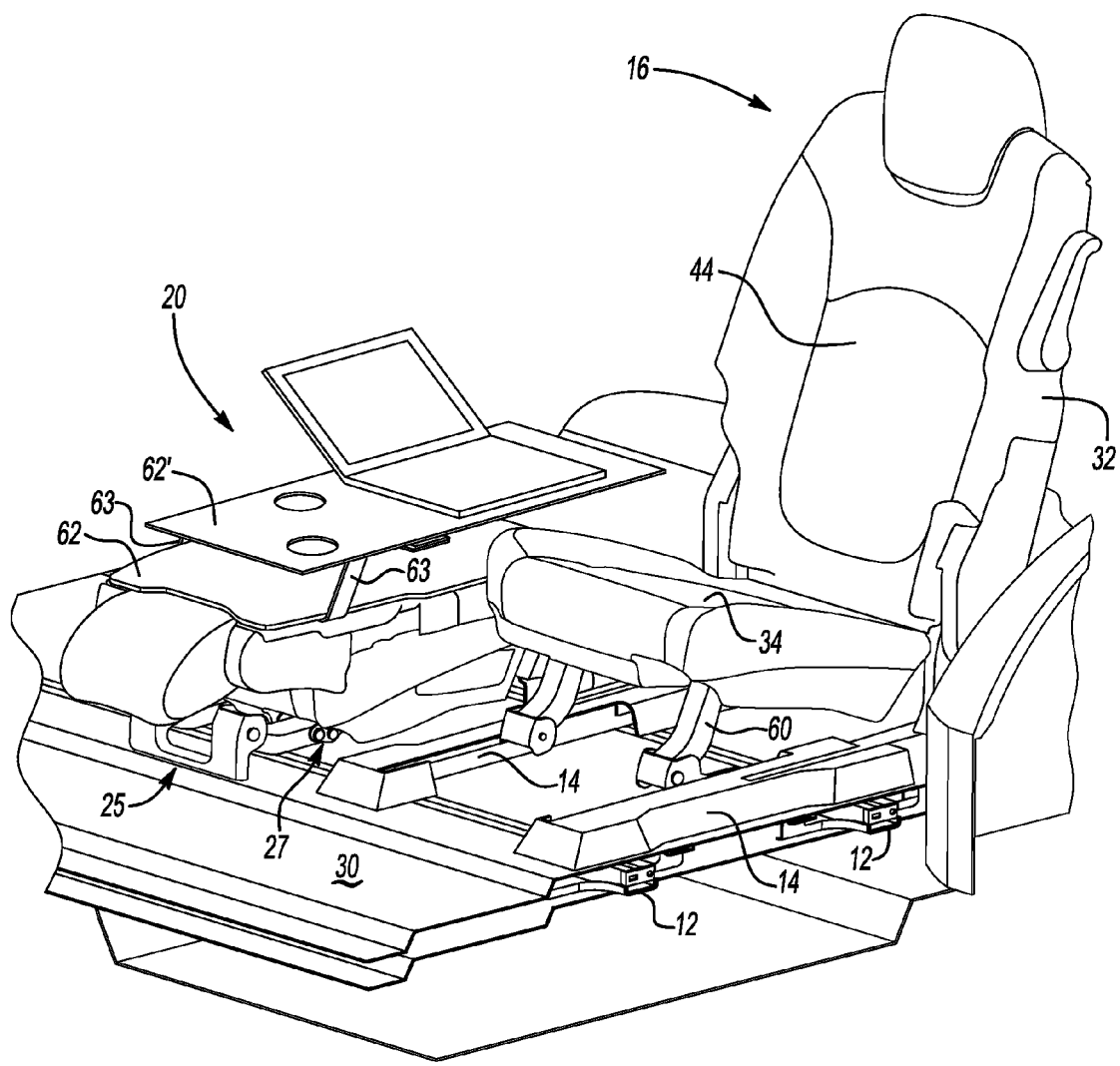
FIG. 8 is a schematic elevated perspective view of the flexible seat row, showing the middle seat in the collapsed configuration, the side seat in the rearward longitudinal position, and a configurable work space on the rearward side of the middle seat.

FIG. 8 shows the first seat 16 in a rearward longitudinal position, in which the side seat has moved rearward along longitudinal rails 14. In the embodiment shown, this movement is approximately 200 millimeters or more. The rearward longitudinal position offers increased leg room for the occupants of the first and third seats 16 and 22 (creating a limousine-like seating position for the occupant), and also allows increased use of the floor space in front of the first and third seats 16 and 22. In vehicles using the flexible seat row 10 as a second seat row, this additional leg room comes at the expense of leg room for the third row seats or rear cargo space where the third row has been removed or stowed. Where the flexible seat row 10 is used as a third row, the additional leg room comes at the expense of cargo space behind the seats. Note that the rearward longitudinal position may be utilized even while the first seat 16 is in the second transverse position and occupying the vacated middle position. The combination of transverse and longitudinal movement allows the first seat 16 to be selectively moved to any position within the combined reach of the first rail (transverse rails 12) or second rail (longitudinal rails 14).

Additional embodiments of the flexible seat row 10 may be achieved by configuring the rearward side 62 of the second seat 20 for use as a work surface; or by adding a separate configurable work surface to the rearward side 62. FIG. 8 shows the first seat 16 in the rearward longitudinal position and second seat 20 in the collapsed configuration. FIG. 8 also shows rearward face 62 in a first work surface configuration and, overlaid and above the first configuration, a second work surface configuration, denoted 62'. In this embodiment, the second work surface configuration 62' rises from the rearward face 62 on moveable arms 63.

Possible work surface configurations would allow occupants of side seat 16 or 22 to place files, electronics, or food and beverage items within easy reach on the rearward surface 62 or second work surface configuration 62'. Features of the second work surface configuration 62' could include closable chambers for storing or holding electronics or other items. Those skilled in the art will recognize many further variations on a configurable work surface for vehicles. A similar configurable work surface could also be placed on the rearward side 46 of the first and third seats 16 and 22, as will be recognized by those having ordinary skill in the art.

A method of allowing access to a third row of seats is also provided. The method is useful for a vehicle having a second row of seats with a middle passenger seat occupying a middle position and two side passenger seats occupying two outer positions. The method comprises: A) Moving the middle passenger seat from a normal middle seat position to a cleared middle seat position, such that the cleared middle seat position does not occupy the same space as the normal middle seat position. B) One of the two side passenger seats may then be laterally slid from one of the outer positions to the middle position, such that the laterally slid side passenger seat occupies the space previously occupied by the middle seat in the normal middle seat position. Therefore, the space previously occupied by the laterally slid side passenger seat may be used to gain access to the third row of seats or the cargo area behind the second row of seats. A further variation may include automatic actuation of the movement of the middle passenger seat and of the lateral sliding of the side seat in response to a signal from a control device.

While the best modes and other embodiments for carrying out the invention have been described in detail, those familiar with the art to which this invention relates will recognize various alternative designs and embodiments for practicing the invention within the scope of the appended claims.

The invention claimed is:

1. A seat row assembly for use with a vehicle interior, comprising:
   a first rail;
   a first seat moveably connected to said first rail, wherein said first seat is selectively moveable along said first rail between a first position and a second position;
   a second seat moveably mounted with respect to said first rail, wherein said second seat is moveable between a first position and a second position, such that said second seat in said first position does not occupy the same space as said second seat in said second position; and
   wherein said first seat in said second position occupies some of the space occupied by said second seat in said first position.

2. The seat row assembly of claim 1, further comprising:
   a second rail substantially perpendicular to said first rail and moveably connected to said first rail; and
   wherein said first seat is moveably connected to said second rail, such that said first seat is selectively moveable along said second rail and said first rail.

3. The seat row assembly of claim 2, wherein said first seat includes a first seat cushion and a first seat back pivotally connected to said first seat cushion, such that said first seat back is pivotable to a collapsed position on said first seat cushion.

4. The seat row assembly of claim 3, wherein said second seat includes a second seat cushion and a second seat back pivotally connected to said second seat cushion, such that said second seat back is pivotable to a collapsed position on said second seat cushion, and wherein said collapsed position of said second seat corresponds to said second position of said second seat.

5. The seat row assembly of claim 2, wherein said first rail is configured to provide transverse movement of said first seat when said seat row assembly is mounted in the vehicle interior.

6. The seat row assembly of claim 5, wherein said first seat is selectively longitudinally moveable along said second rail between a forward position and a rearward position, and said forward position and said rearward position are differentiated by a longitudinal distance greater than or equal to 200 millimeters.

7. The seat row assembly of claim 2, further comprising:
   a third rail parallel to said second rail, moveably connected to said first rail;
   a third seat moveably connected to said third rail, such that said third seat is selectively moveable along said first rail and said third rail;
   wherein said third seat is moveable along said first rail between a first position and a second position; and
   wherein said second position of said third seat occupies some of the space occupied by said first position of said second seat.

8. The seat row assembly of claim 7, wherein said third seat includes a third seat cushion and a third seat back pivotally connected to said third seat cushion, such that said third seat back is pivotable to a collapsed position on said third seat cushion.

9. The seat row assembly of claim 4, wherein the vehicle interior includes a vehicle floor pan and a C-pillar, wherein said first rail is configured to mount to said vehicle floor pan, and wherein said second position and said C-pillar are separated by a clearance distance greater than or equal to approximately 400 millimeters.

10. The seat row assembly of claim 2, wherein said first side seat is configured such that a child seat may be placed in said first seat, such that said child seat does not occupy the same space as said second position of said second seat when said first seat is in said second position.

11. The seat row assembly of claim 1, wherein said first seat in said second position occupies substantially all of the space occupied by second seat in said first position.

12. The seat row assembly of claim 4, wherein said first seat in said second position occupies substantially all of the space occupied by second seat in said first position.

13. A folding passenger seat for a vehicle, comprising:
a seat back having a forward side and a rearward side;
a seat cushion having a front portion and a rear portion;
a first hinge linking said seat back and said seat cushion;
a second hinge linking said first hinge and said rear portion;
a slidable locking bracket configured to restrict pivoting of said second hinge;
wherein said slidable locking bracket is moveable between a locked position and an unlocked position, and wherein the folding passenger seat has an upright seat configuration and a collapsed seat configuration; and
wherein said collapsed seat configuration is characterized by a decrease in vertical height of said rear portion of said seat cushion relative to said upright seat configuration.

14. The folding passenger seat of claim 13, wherein said collapsed seat configuration is further characterized by a rearward movement of said seat cushion relative to said upright seat configuration.

15. The folding passenger seat of claim 14, wherein said upright seat configuration corresponds to said locked position of said slidable locking bracket and said collapsed seat configuration corresponds to said unlocked position of said slidable locking bracket.

16. The folding passenger seat of claim 14, further comprising:
at least one transverse rail, configured to be positioned in a transverse direction with respect to the interior of the vehicle when installed in the vehicle;
at least one longitudinal rail, substantially perpendicular to said at least one transverse rail, and moveably connected to said at least one transverse rail; and
wherein said seat cushion is moveably connected to said at least one longitudinal rail such that the folding passenger seat is selectively moveable along said transverse direction and said longitudinal direction.

17. The folding passenger seat of claim 16, wherein the vehicle further includes a vehicle floor pan, and said at least one longitudinal rail is configured to mount to the vehicle floor pan, and wherein said rearward side of said seat back is substantially parallel to said vehicle floor pan when the folding passenger seat is in said collapsed seat configuration.

18. The folding passenger seat of claim 13, further comprising:
a work surface mounted with respect to said rearward side of said seat back, wherein said work surface has a first work surface configuration and a second work surface configuration.

19. A method of allowing access to a third row of seats in a vehicle having a second row of seats with a middle passenger seat occupying a middle position and two side passenger seats occupying two outer positions, comprising:
moving the middle passenger seat from a normal middle seat position to a cleared middle seat position, wherein the middle seat in said cleared middle seat position does not occupy the same space as the middle seat in normal middle seat position; and
laterally sliding one of the two side passenger seats from one of the outer positions to the middle position, such that the laterally slid side passenger seat occupies the space previously occupied by the middle seat in said normal middle seat position.

20. The method of claim 19, wherein said moving the middle passenger seat and said laterally sliding one of the two side passenger seats occurs automatically in response to a signal from a control device.

* * * * *